United States Patent [19]
Iwata et al.

[11] Patent Number: 5,293,293
[45] Date of Patent: Mar. 8, 1994

[54] DISK CARTRIDGE FOR EXCHANGEABLY ACCOMMODATING A DISK-SHAPED RECORDING MEDIUM

[75] Inventors: Hirokimi Iwata, Ibaragi; Shuji Haruna, Tokyo, both of Japan

[73] Assignee: Sony Corporation, Japan

[21] Appl. No.: 851,874

[22] Filed: Mar. 16, 1992

Related U.S. Application Data

[63] Continuation of Ser. No. 429,805, Oct. 31, 1989, abandoned.

[30] Foreign Application Priority Data

Nov. 11, 1988 [JP] Japan .................. 63-147216

[51] Int. Cl.⁵ .................................. G11B 23/03
[52] U.S. Cl. .................. 360/133; 369/284; 369/291
[58] Field of Search ............ 360/133; 369/289, 291

[56] References Cited

U.S. PATENT DOCUMENTS

| | | | |
|---|---|---|---|
| 4,455,642 | 6/1984 | Inaba | 369/291 |
| 4,793,480 | 12/1988 | Gelardi et al. | 369/291 |
| 4,849,844 | 7/1989 | Kato | 360/133 |
| 4,916,567 | 4/1990 | Grobecker et al. | 360/133 |
| 5,093,823 | 3/1992 | Oowerkerk et al. | 360/133 |
| 5,150,354 | 9/1992 | Iwata et al. | 369/291 |

FOREIGN PATENT DOCUMENTS 57-200965 12/1982 Japan ................... 360/133

Primary Examiner—Eugene R. LaRoche
Assistant Examiner—Michael C. Kessell
Attorney, Agent, or Firm—Ronald P. Kananen

[57] ABSTRACT

A disk cartridge includes a main body of the cartridge having an opening or its major surface by which the signal recording surface of an optical disk accommodated in the main body is exposed to outside and an aperture formed on the lateral surface orthogonal to the major surface of the main body for enabling the optical disk to be inserted into and taken out of the cartridge for disk exchange. The disk cartridge also an opening/closing member which is rotatably supported by the main body by pivot pins provided at its one end for engaging in recesses in the aperture in the main body, for opening and closing the aperture and, which is provided at its other end with a resilient arm having a retaining end pawl engageable with a mating retaining section in the main body. By actuation of the opening/closing member, the aperture in the main body is opened or closed to permit exchange of the optical disk.

2 Claims, 7 Drawing Sheets

DISK CARTRIDGE FOR EXCHANGEABLY ACCOMMODATING A DISK-SHAPED RECORDING MEDIUM

This application is a continuation of application Ser. No. 07/429,805 filed Oct. 31, 1989, now abandoned.

BACKGROUND OF THE INVENTION

1. Field of the Invention

This invention relates to a disk cartridge for exchangeably accomodating a disk-shaped recording medium, such as an optical disk or magneto-optical disk.

2. Related Art Statement

Up to now, a disk shaped recording medium, such as a write-once type optical disk, has been used. This type of the disk is accommodated in a disk cartridge when attached to the recording and/or reproducing apparatus with a view mainly to preventing data signal record and/or reproduce errors caused by the signal recording surface being injured or contaminated due to contact directly with part of a loading mechanism or due to contact of hand or finger or deposition of dust and dirt during insertion into or detachment from the recording and/or reproducing apparatus.

In such disk cartridge in which the disk is accommodated in a cartridge when the disk is attached to the recording and/or reproducing apparatus, there is proposed in, for example, in U.S. Pat. No. 4,746,013, a disk-exchange type disk cartridge wherein, for enabling the disk to be exchanged as desired and for utilizing the cartridge more efficiently, a plurality of disks may be exchangeably attached to the recording and/or reproducing apparatus.

As this type of disk cartridge, the present Assignee has already proposed an arrangement shown in the specification and drawings of the Japanese laid open Patent Publication No. 57970/1988 or an arrangement shown in the specification and drawings of the Japanese Utility Model Application No. 86810/1988. The disk cartridge shown in these specifications and drawings is so arranged that a lid is provided at a disk insertion/detachment aperture formed in the rear surface of the main body of the cartridge accommodating the disk opposite to its front surface or shutter attachment surface for opening or closing the aperture, and that this lid is opened to enable disk exchange. The lid has an L-shaped cross-section for closing the disk insertion/attachment aperture extending from the upper rear surface towards the lateral rear surface of the main body of the cartridge, and is pivotally connected to the rear parts of the lateral walls of the main cartridge body by pivotal engagement between pivot pins and engaging recesses, so as to be rotated in a direction normal to the plane of the main body of the cartridge. The aperture opening/closing lid has an engaging recess on the lower inner rear surface which may be engaged with a mating projection on the rear edge of the main body of the cartridge when the lid is brought to a position of closing the disk insertion/detachment aperture.

With the above described disk cartridge, disk exchange may be made upon opening and closing the aperture opening/closing lid, while the disk cartridge may be attached to the recording and/or reproducing apparatus in the similar manner to the ordinary disk cartridge by closing the disk insertion/detachment aperture by the opening/closing lid.

The aperture opening/closing lid of the above described disk cartridge is rotatably supported by the main body of the cartridge by means of pivots on its both sides, so that a thrust pressure is necessarily applied to the central flat surface section intermediate both side pivots when the lid is opened by disengaging the engaging recess away from the mating projection of the main body of the cartridge. As a result, the upper central surface of the lid and the upper surface zone of the main body of the cartridge about the disk insertion/detachment aperture are flexed severely towards the inside of the main body of the disk cartridge. With the aperture opening/closing lid or the main body of the cartridge being thus flexed inwardly of the disk cartridge, there is the risk that the disk accommodating space in the main body of the cartridge becomes straightened to injure the accommodated disk. There is also the risk that the disk cartridge as a whole is deformed to interfere with smooth insertion and detachment of the disk cartridge into or from the recording/reproducing apparatus, and that, in addition, the disk is brought into contact with the main body of the cartridge upon rotation of the disk to cause damages to the disk.

OBJECT AND SUMMARY OF THE INVENTION

It is an object of the present invention to provide a disk cartridge in which disk exchange may be performed upon opening and closure of an opening/closing member by providing the main body of the cartridge with a disk insertion/detachment aperture that is opened or closed by the opening/closing member.

It is another object of the present invention to provide a disk cartridge in which no unnecessary pressure is applied to the opening/closing member or to the main cartridge body during opening or closure of the opening/closing member adapted to open or close the disk insertion/detachment aperture to prevent the opening/closing member or the main body of the cartridge from being flexed, as well as to prevent the disk cartridge from being deformed.

It is another object of the present invention to provide a disk cartridge in which the main body of the cartridge is freed of deformation and maintained in its design size and shape to assure reliable attachment or detachment of the disk cartridge to or from the recording/reproducing apparatus.

It is yet another object of the present invention to provide a disk cartridge in which the opening/closing operation of the aperture opening/closing member is facilitated and a stable lid closure state is assured.

For accomplishing the above objects, the disk cartridge of the present invention includes a main body of the cartridge provided with an opening for exposing the signal recording surface of an accommodated disk-shaped recording medium to outside, and also with an insertion/detachment aperture for the disk-shaped recording medium on its side normal to the main surface in which the opening is formed, and a shutter slidably mounted to the main body of the cartridge for opening or closing the opening. The disk cartridge also includes an aperture opening/closing member which is rotatably supported by the main body of the cartridge by having a pivot section pivotally connected to one end of the disk insertion/detachment aperture in the main body of the cartridge to open or close the aperture, and which is provided at the side opposite to the pivot section with a resilient arm having a retaining end pawl engaging with a mating retaining section in the main body of the cartridge.

The disk cartridge according to the present invention also includes a position control section at the one side provided with the pivot section adapted for pivotally connecting the aperture opening/closing member to the main body of the cartridge. The position control section is adapted to engage with a portion of the main body of the cartridge.

The disk cartridge of the present invention is so designed that the aperture opening/closing member supported by the main body of the cartridge by means of the pivot section is rotated within a plane parallel to the plane of the main body of the cartridge, that is, within the major surface thereof, for opening or closing the disk insertion/detachment opening in the main body of the cartridge.

When the opening/closing member is at the position of closing the disk insertion/detachment aperture in the main body of the cartridge, the rotating end pawl at the side of the resilient arm opposite to the pivot section is retained by the mating retaining section of the main body of the cartridge.

When the position control section is provided at the one end of the opening/closing member provided with the pivoting section, the control section engages with a portion of the main body of the cartridge for locking the opening/closing member to the main body of the cartridge.

The aperture opening/closing member, which is in the state of closing the disk insertion/detachment aperture, may be unlocked from the main body of the cartridge by flexing the resilient arm and disengaging the retaining end pawl thereof from the mating retaining section of the main body.

These and other objects and advantages to be derived from the present invention will become more apparent from the following description of a preferred embodiment of the invention.

DETAILED DESCRIPTION OF PREFERRED EMBODIMENT

Figure 1:
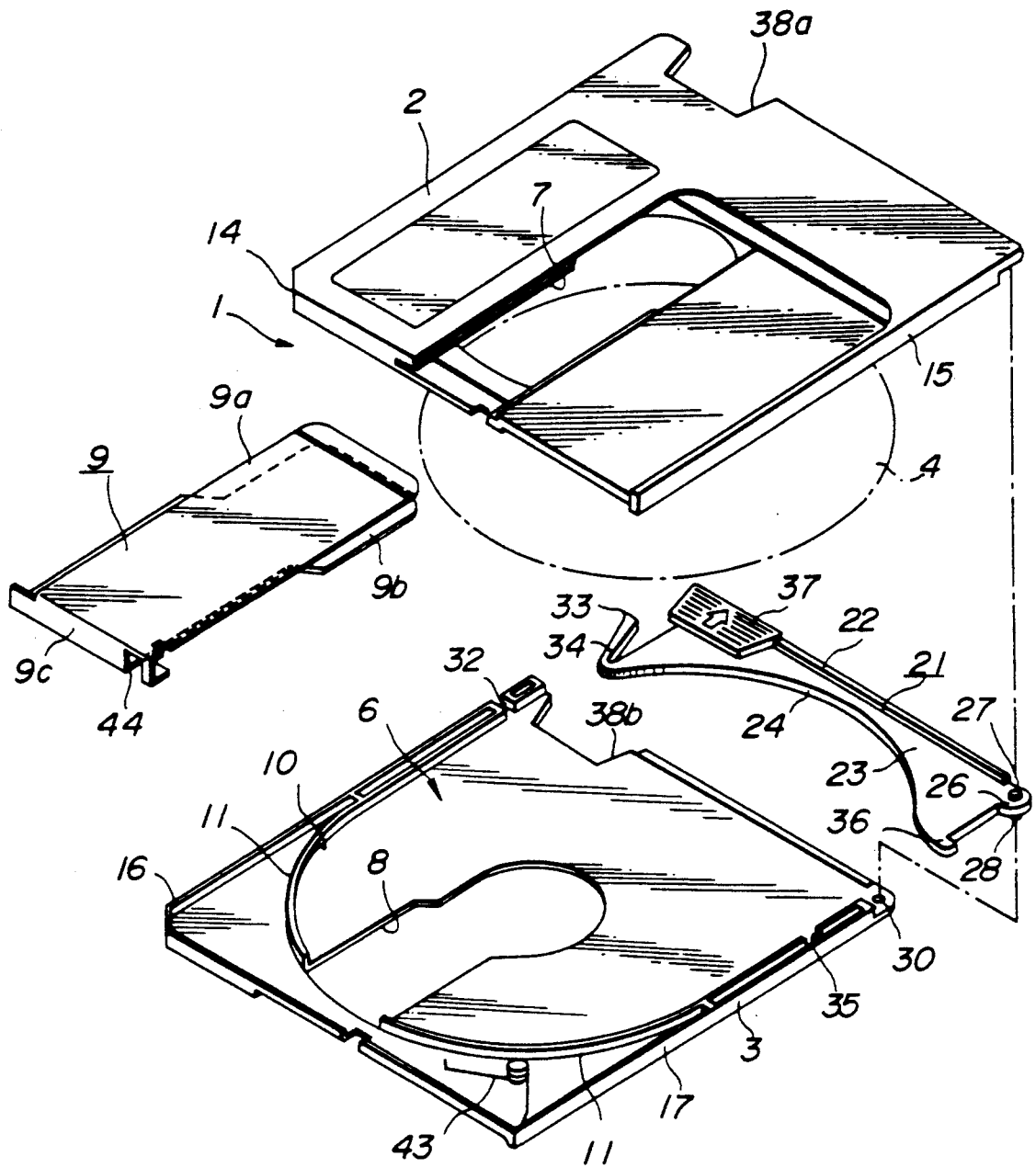
FIG. 1 is an exploded perspective view of a disk cartridge according to the present invention.

By referring to the drawings, a preferred embodiment of the present invention will be explained in more detail.

Figure 2:
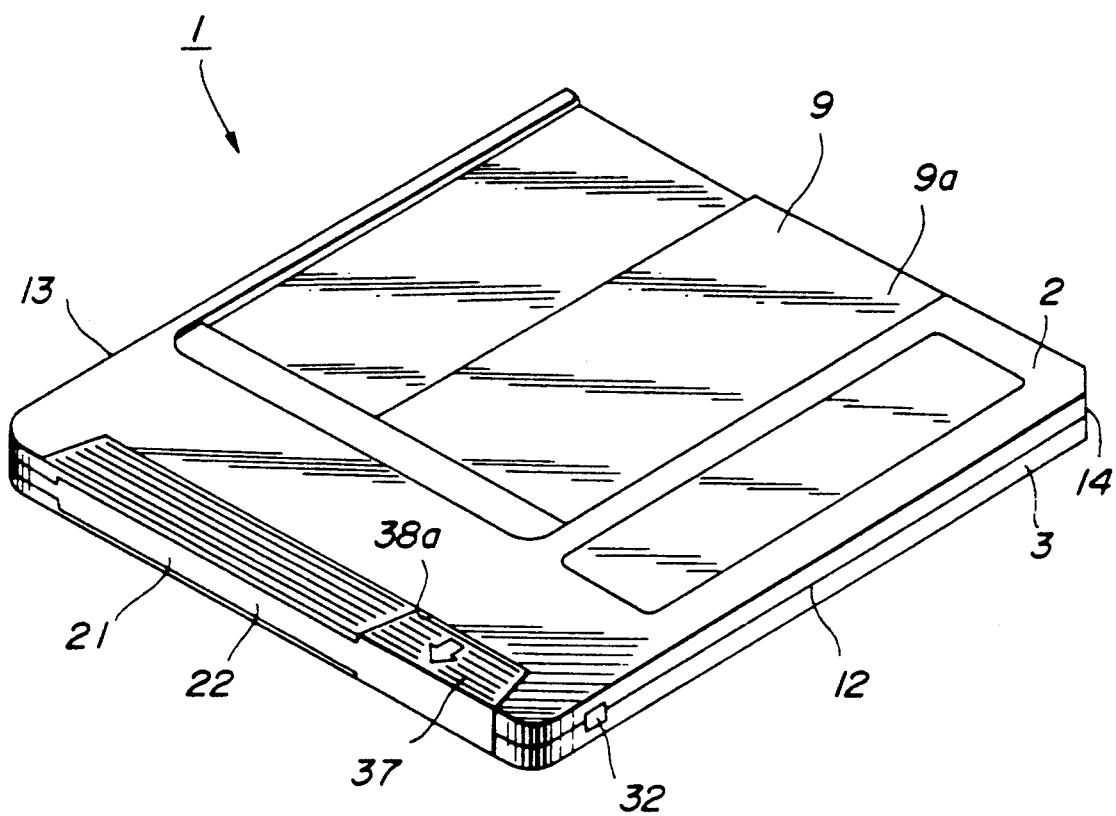
FIG. 2 is an overall perspective view of the disk cartridge.

As shown in FIGS. 1 and 2, the disk cartridge of the present invention includes a main body of the cartridge 1 formed by an upper half 2 and a lower half 3 abutted and connected to each other. These halves 2 and 3 are each in the form of a flat rectangular plate which is formed by, for example, injection molding of a suitable synthetic resin material. Within this main body of the cartridge 1 is rotatably enclosed an optical disk 4 provided with a disk-shaped recording medium, such as a write-once type optical recording medium. Extending from the central sections towards the front edges of the upper and lower halves 2 and 3 of the main body 1 are substantially rectangular openings 7 and 8 which are adapted for exposing a central chucking section of an optical disk 4 accommodated therein and the signal recording surface of the optical disk 4 towards outside and which are faced by data signal recording/reproducing means, such as an optical pickup, adapted to record or reproduce data signals on or from the disk 4.

Figure 3:
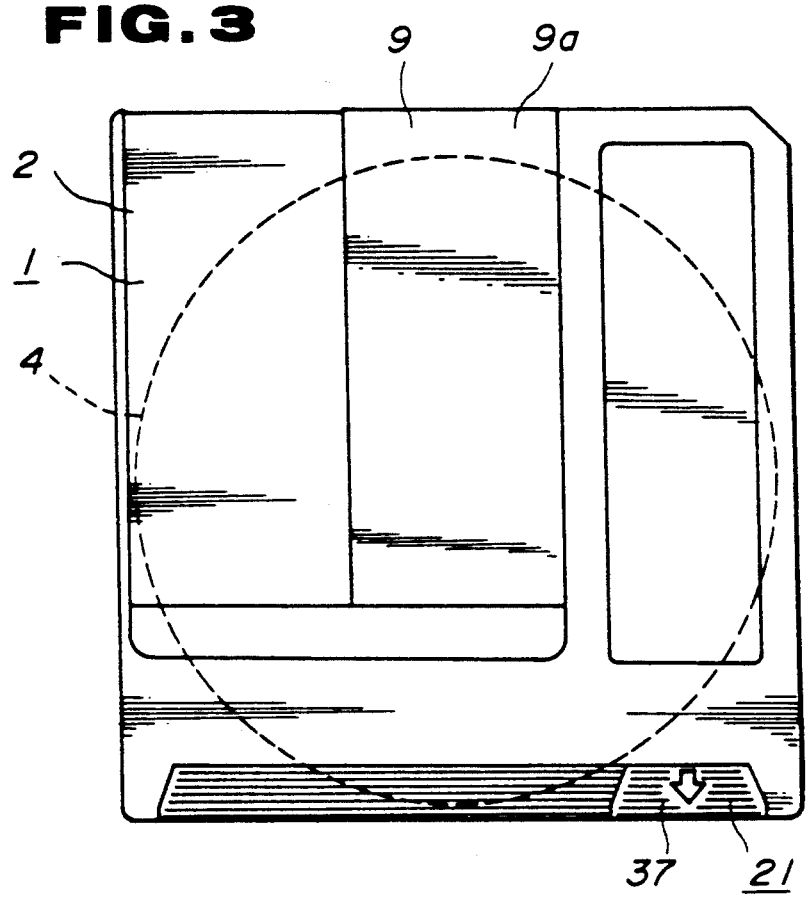
FIG. 3 is a plan view of the disk cartridge.
Figure 4:
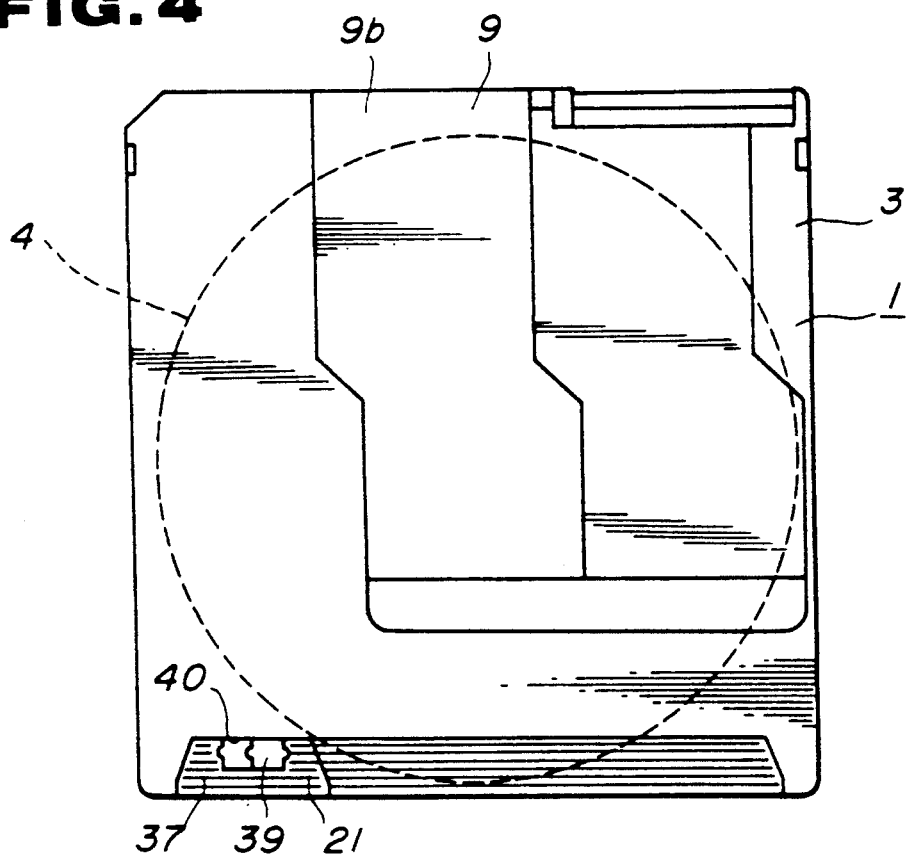
FIG. 4 is a bottom view of the disk cartridge.

A shutter 9 for opening or closing the openings 7 and 8 is slidably mounted on the main body of the cartridge 1. This shutter 9 is formed by a thin metallic plate, such as a stainless steel plate, which is bent into the form of a letter U, and is made up of a first closure section 9a for closing the opening 7 in the upper half 2, a second closure section 9b for closing the opening 8 in the lower half 3 and a connecting section 9c for connecting these closure sections 9a and 9b to each other. As shown in FIGS. 2, 3 and 4, the shutter 9 is fitted from the front side over the outer surfaces of the main body of the cartridge 1, with the first and the second closure sections 9a and 9b extending over the openings 7 and 8 in the flat surface of the closure members 9a and 9b and sliding on the flat surfaces of the main body of the cartridge 1.

On the inner surfaces of the upper and the lower halves 2 and 3, there are formed substantially circular recesses 10 each having an inside diameter slightly larger than the outside diameter of the optical disk 4. The recesses 10 are delimited towards the front side by arcuate ribs 11 formed on the inner surfaces of the upper and lower halves 2 and 3. These ribs are formed upright on the bottom surfaces of the recesses 10 and of such a height that the ribs abut on each other when the upper and the lower halves 2 and 3 are combined together to form the main body of the cartridge 1. These arcuate ribs 11 are abutted to each other to form a forward wall of the main body of the cartridge 1. The recesses 10 are abutted to each other to form a disk accommodating section 6 when the upper and the lower halves 2 and 3 are abutted and connected to each other.

On the confronting lateral sides of the upper and the lower halves 2 and 3, there are formed upright walls 14, 15; 16, 17 forming lateral walls 12 and 13 of the main body of the cartridge 1 when abutted to each other. Conversely, the rear side of the main body of the cartridge 1, opposite to its front side fitted with the shutter 9, is free from closure walls such as upright walls or arcuate ribs and thus in the completely opened state. The rear side of the main body of the cartridge 1, formed in this manner by abutting the upper and the lower halves 2 and 3 to each other, defines an opening extending over its whole width and functioning as a disk insertion/detachment aperture 20 through which the optical disk 4 may be inserted into or detached from the main body 1.

Figure 5:
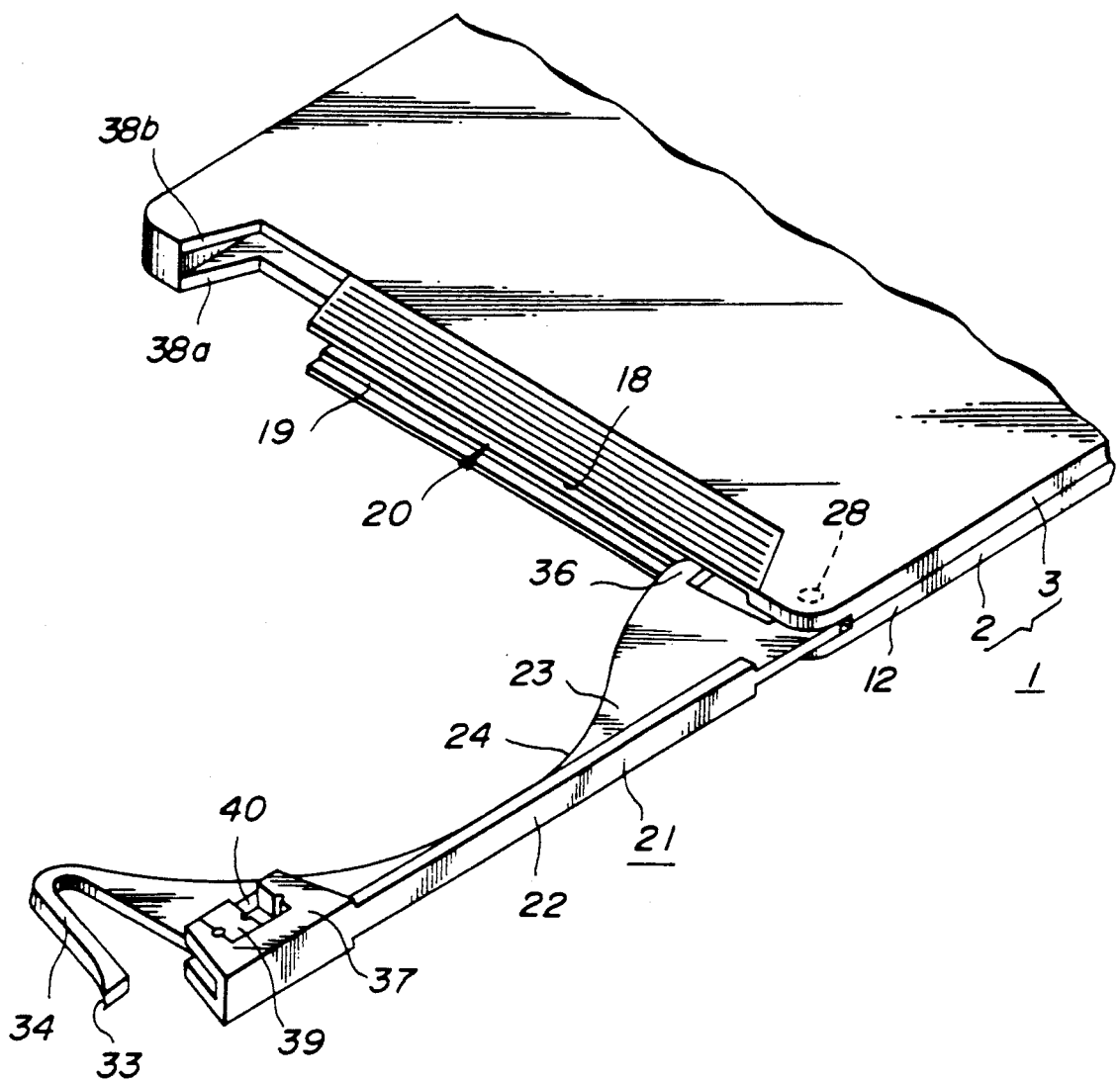
FIG. 5 is an enlarged partial perspective view showing the disk insertion/detachment aperture side of a main body of the cartridge.
Figure 8:
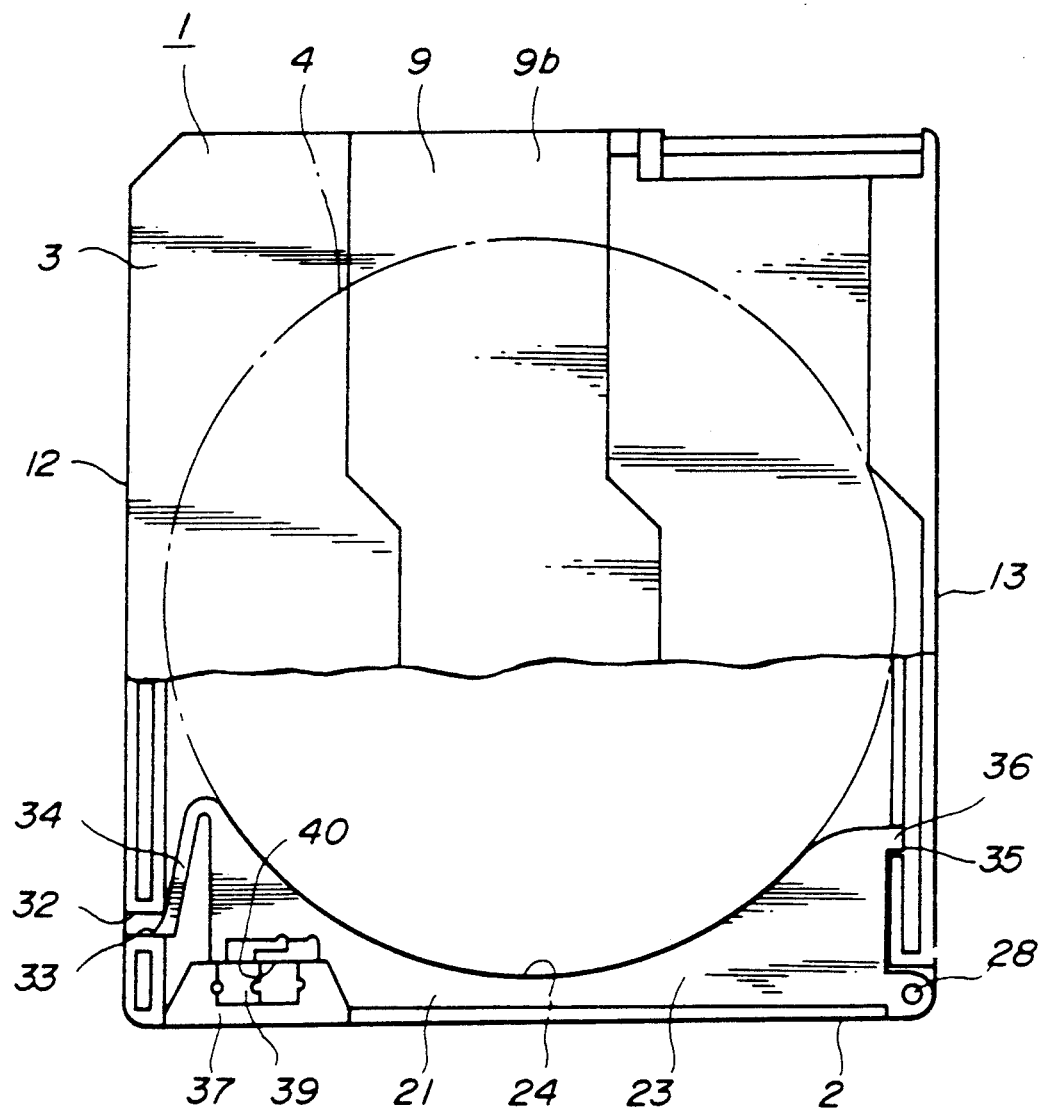
FIG. 8 is a bottom view, partly broken away, of the main body of the cartridge, with the disk insertion/detachment aperture closed.

An opening/closing member 21 is provided on the main body of the cartridge 1 for opening or closing the disk insertion/detachment aperture 20. This opening/closing member 21 in formed by, for example, injection molding the same synthetic resin material as that of the upper and the lower halves 2 and 3, as shown in FIGS. 1 and 5. The opening/closing member 21 is formed by a side wall section 22 forming the rear side wall of the main body of the cartridge 1 when the member 21 is inserted into the aperture 20 for closing the aperture 20 as shown in FIGS. 2 and 8, and a fitting section 23 projecting from one lateral side of the side wall section 22 and adapted for intruding into the inside of the main body of the cartridge 1 for defining the disk accommodating section 6. The side wall section 22 is of the same height and width as the disk insertion/detachment aperture 20. The fitting section 23 forms the rear side wall of the disk accommodating section 6 when the opening/closing member 21 is inserted into the disk inserting/detachment aparture 20. For this reason, an arcuate recess 24 is formed on the distal side of the fitting section 23 so as to be contiguous to the substantially arcuate recess 10 of the upper and the lower halves 2 and 3.

Figure 6:
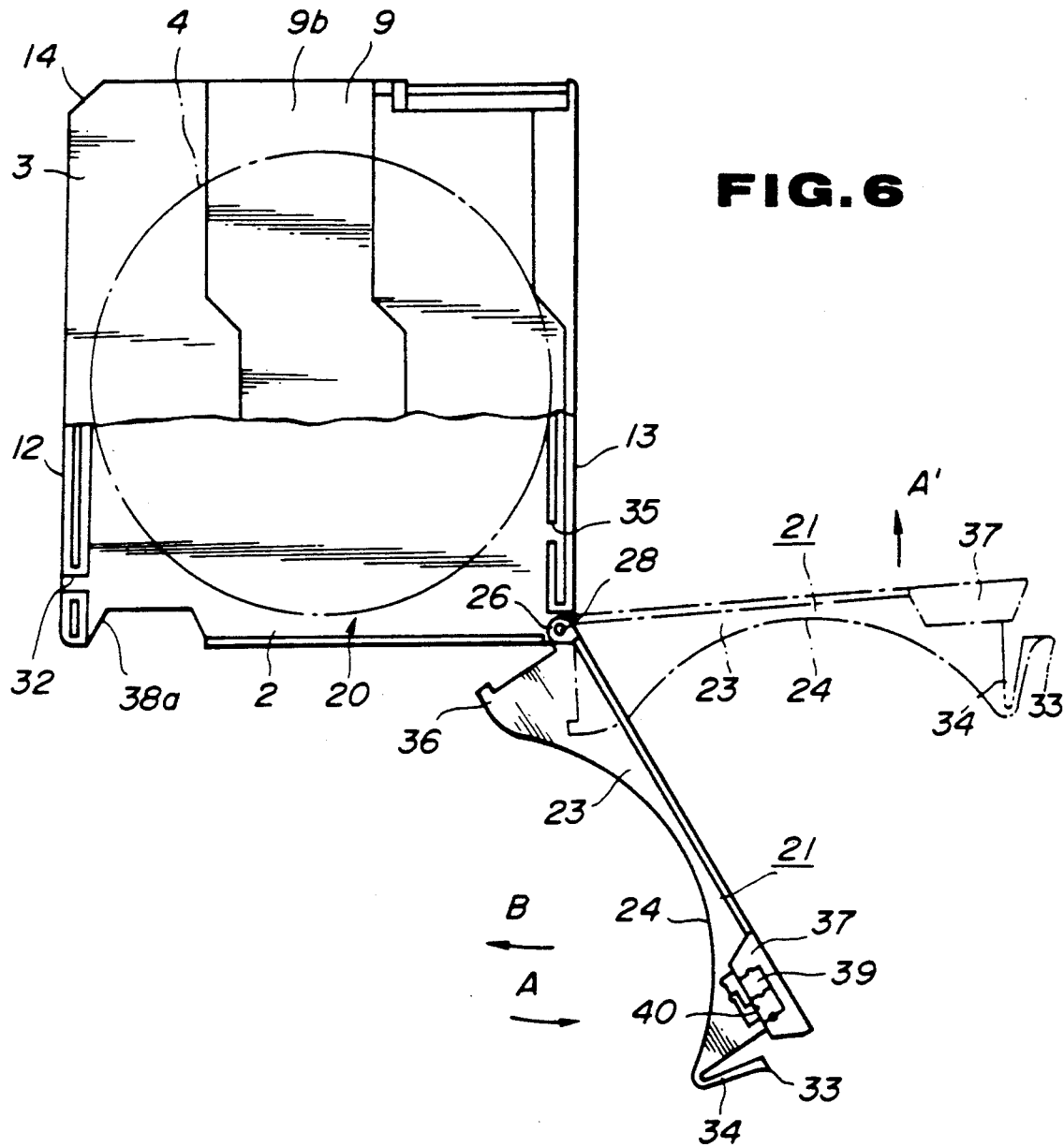
FIG. 6 is a bottom view, partially broken away, of the main body of the cartridge, with the disk insertion/detachment aperture being opened.
Figure 7:
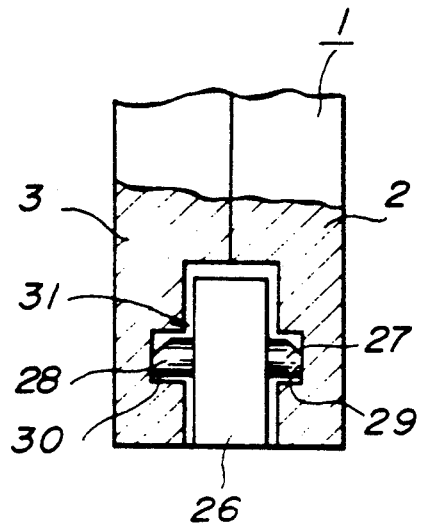
FIG. 7 is a cross-sectional view showing a pivot section for the aperture opening/closing member.

A projection 26 is provided at one corner of the aperture opening/closing member 21 along the extending direction of the side wall section 22, and pivot pins 27, 28 are provided upright on the upper and the lower sides of the proejction 26. These pivot pins 27, 28 are engaged in mating recesses 29, 30 at the corresponding rear side corners of the upper and the lower halves 2 and 3, as shown in FIG. 7, to form a pivot section 31 for rotatably supporting the aperture opening/closing member 21 with respect to the main body 1. The aperture opening/closing member 21, thus supported by the main body 1, may be rotated within a plane parallel to the plane of the main body 1, with the pivot section 31 as the center of rotation, as shown in FIG. 6.

The pivoting section 31, pivotally supporting the aperture opening/closing member 21, may be so designed that, conversely to the above mentioned arrangement, the pivot pins 27, 28 are formed on the upper and lower halves 2 and 3 and the mating recesses 29, 30 are formed in the projection 26.

The other side of the aperture opening/closing member 21, opposite to the side thereof provided with the pivot pins 27, 28, is formed with a resilient arm 34 having a retaining end pawl 33 engaging with a mating hole 32 which is formed in the other lateral wall 13 of the main body of the cartridge 1 and which is adapted for functioning as a retaining section. As shown in FIG. 6, this resilient arm 34 is formed integrally with the other end of the fitting section 23 for extending from the end of the fitting section 23 towards the side wall section 22 and may be resiliently deformed with the connecting point to the fitting section 23 as the fulcrum. The one end of the aperture opening/closing member 21 is provided with a position control section 36 which is formed as a boss extending parallel to the pivot pins 27, 28 and adapted for engaging in a mating recess 35 in the inner lateral side of the lateral wall 12 of the main body of the cartridge 1. This boss 36 is formed for projecting laterally from the one end of the fitting section 23. This position control member 36 need only be of such a contour that the member 36 is engaged with a mating engaging portion of the main body of the cartridge 1 to control the rotational position of the aperture opening/closing member 21. Thus the member 36 may be in various forms, such as a pawl or finger, mating in a corresponding engaging portion of the main body of the cartridge 1.

The other end of the side wall section 22 of the aperture opening/closing member 21 is provided with a generally trapezoidal gripping section 37 adapted for facilitating the rotation of the aperture opening/closing member 21 and having the same thickness as the thickness of the main body 1. When the aperture opening/closing member 21 is rotated for closing the disk insertion/detachment aperture 20, the gripping section 37 fits into mating recesses 38a, 38b on the rear side edges of the upper and lower halves 2 and 3 of the main body 1 so as to be flush with the surfaces of the upper and the lower halves 2 and 3.

On the lower side of the gripping section 37 having the above thickness, that is, on the side thereof which will the lower half 3 on attachment of the member 21 to the main body of the cartridge 1, there is provided a post recording inhibit member 39, as shown in FIG. 5 and 6. This post-recording inhibit member 39 is slidably mounted in an engaging hole 40 in the gripping section 37 for movement therein, so that, when the disk cartridge is attached to the recording and/or reproducing apparatus, it can be detected at the apparatus whether the post recording of data signals may be made on the optical disk 4 or such post-recording is inhibited.

The above described aperture opening/closing member 21 is rotatably supported by the main body of the cartridge 1 by having the pivot pins 27, 28 engaging in the mating recesses 29, 30 of the upper and the lower halves 2 and 3, as shown in FIGS. 5 and 6. As the fitting section 23 is rotated into fitting with the disk insertion/detachment aperture 20, that is, in the direction shown by an arrow B in FIG. 6, the resilient arm 34 intrudes into the disk insertion/detachment aperture 20, as the resilient arm 34 is resiliently deformed by the inner surface of the other side wall 13 of the main body 1. When the opening/closing member 21 has been rotated to a position of completely closing the disk insertion/detachment aperture 20, the arm 34 is resiliently restored, as shown in FIG. 8, the retaining end pawl 33 then engaging in the mating hole 32 for locking the opening/closing member 21 to the main body 1. At this time, the position control section 36 provided at the one end of the opening/closure member 21 engages with the engaging hole 35 in the inner lateral surface of the lateral wall 12 of the main body 1. The side wall section 22 engages with mating steps 18, 19 formed on the inner surface at the rear side of the upper and the lower halves 2 and 3 for completely closing the disk insertion/detachment aperture 20. The aperture opening/closing member 21, which is locked to the main body of the cartridge 1 in this manner for closing the disk insertion/detachment aperture 20, may be fitted in the precisely controlled position with respect to the main body of the cartridge 1 by the retaining end pawl 33 and the position control section 36, as shown in FIG. 8. Inasmuch as the position control section 36 is provided at the side of the opening/closing member 21 provided with the pivot section 31, any load applied to the aperture opening/closing member 21 may be received by the position control section 36 to prevent an excess load from being applied to the pivot section 31. This results in the pivot section 31 being protected from application of external forces or pressures.

For exposing the disk insertion/detachment aperture 20 of the main body, a thrust tool, such as a pin, is introduced via the hole 32 to cause the resilient arm 34 to be deformed resiliently to disengage the end pawl 33 out of the mating hole 32. With the pawl 33 thus disengaged, the gripping section 37 is gripped to rotate the aperture opening/closing member 21 in the direction shown by an arrow A in FIG. 6 to expose the disk insertion/detachment aperture 20. With the aperture 20 thus exposed, the optical disk 4 may be exchanged by way of the aperture 20.

Figure 10:
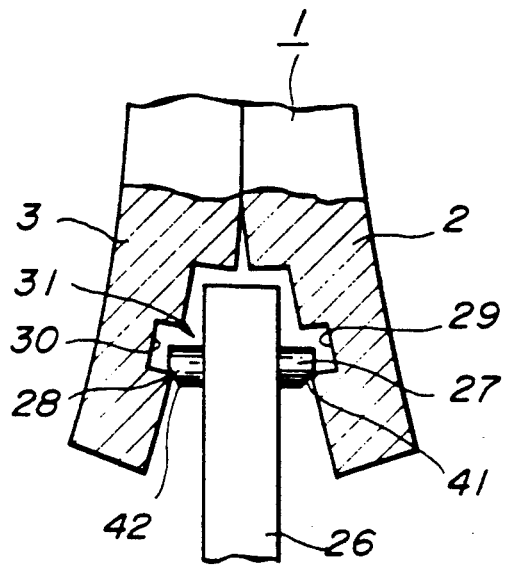
FIG. 10 is a cross-sectional view of the aperture opening/closing member showing the state in which pivot pins are disengaged from the mating recesses.
Figure 9:
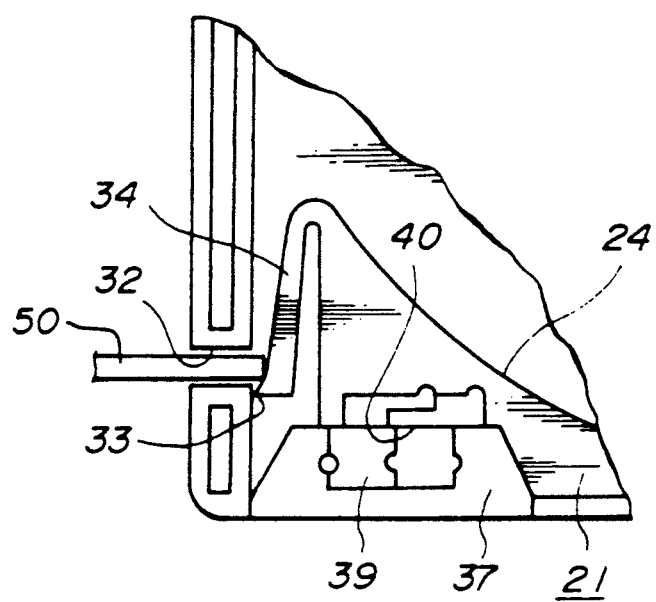
FIG. 9 is a partial bottom view of the main body of the disk cartridge showing the state in which the resilient arm is thrust to release the locking of the retaining pawl.

It will be noted that, as shown in FIG. 7, the end faces of the pivot pins 27, 28 forming the pivot section 31 pivotally supporting the aperture opening/closing member 21 by the main body of the cartridge 1, are formed with inclined guide surfaces 41 and 42 adapted for smoothly disengaging the pivot pins 27, 28 from the recesses 29, 30 when the opening/closing member 21 is further rotated with respect to the main body of the cartridge 1 in the direction shown by an arrow A' from the position shown by the chain-dotted line in FIG. 6. That is, when the aperture opening/closing member 21 is further rotated from the chain-dotted line position in FIG. 6 in the direction shown by the arrow A' shown therein, until the projection 26 abuts against the rear end face of the side wall 12 of the main body of the cartridge 1, so as to be rotated about the abutting point as the center of rotation, the inclined guide surfaces 41 and 42 ride on the end faces of the engaging recesses 29, 30. The upper and the lower halves 2 and 3 are extended apart from each other by the pivot pins 27, 28 as shown in FIG. 10, the inclined guide surfaces 41 and 42 then guiding the pivot pins 27, 28 so as to escape from the recesses 29, 39. In this manner, the inclined guide surfaces 41, 42 function to disengage the pivot pins 27, 28 from the mating recesses 29, 30, when the aperture opening/closing member 21 is rotated in the direction of the arrow A in FIG. 6 a distance which is more than is necessary, so that the pivot section 31 inclusive of the pivot pins 27, 28 and hence the aperture opening/closing member 21 may be protected from possible damages.

It is noted that the aforementioned shutter 9 is slidingly biased in a direction of closing the openings 7 and 8 by a torsion spring 43 provided at one front side corner of the main body 1. The shutter opening operation is performed by an operating pin, not shown, provided to the recording/reproducing apparatus, not shown, and adapted for engaging in a through-hole 44 in the connecting section 9c. However, the shutter 9 may also be maintained in the position of closing the openings 7 and 8 by a locking member, not shown, instead of by the torsion spring 43, in which case the shutter 9 may be slid for exposing the openings 7 and 8 by an operating pin adapted for releasing the locking by the locking member.

In the above described embodiment, the disk insertion/detachment aperture 20 is formed in the rear surface of the main body of the cartridge 1. However, the disk insertion/detachment aperture 20 may also be provided on the lateral side which is not provided with the shutter 9 and the aperture opening/closing member 21 is mounted rotatably.

The disk cartridge of the present invention is so arranged that the closing/opening member for the disk insertion/detachment aperture is mounted so as to be rotated with the pivoting section to the main body of the cartridge as the center of rotation and within a plane of the main body of the disk cartridge, and may be locked with the retaining end pawl at the resilient arm at the other end of the opening/closing member opposite to the pivot section engaging with the mating retaining section provided in the main body of the cartridge. Thus the unlocking of the main body of the cartridge by the aperture opening/closing member is performed simply by thrusting the resilient arm, while the exposure of the disk insertion/detachment aperture may be realized simply by gripping and rotating the aperture opening/closing member. Since no unnecessary load is applied to the main body of the cartridge during the operation of opening or closing the disk insertion/detachment aperture, it becomes possible to prevent the main body of the cartridge from being deformed as well as to sufficiently protect the disk-shaped recording medium accommodated in the main body of the cartridge.

Also, when the opening/closing member is at the position closing the disk insertion/detachment aperture in the main body of the cartridge, the position control section of the opening/closing member, provided at the side thereof provided with the pivot section, is engaged with a mating engaging portion of the main body of the cartridge. Thus the load applied to the opening/closing member may be sustained at the position control section to realize the protection of the pivot section and to improve durability and reliability of the disk cartridge.

In addition, since the post-recording inhibit member is provided on the aperture opening/closing member, there is no necessity of providing a supporting projection for slidably supporting the post-recording inhibit member on the main body of the cartridge so that a smooth surface may be provided within the main body and hence a possible damage to the recording medium may be reliably inhibited at the time of an exchange operation for the disk-shaped recording medium. Above all, the post-recording inhibit member is provided on the gripping section having a larger thickness, so that a sufficient mounting strength is warranted. Since the aperture opening/closing member provided with the post-recording inhibit member is mounted with position control on the main body of the cartridge, the post-recording inhibit member may be mounted with inproved accuracy.

What is claimed is:

1. A disk cartridge adapted to releasably receive therein a disk-shaped recording medium for engagement by a recording/reproducing means within the cartridge, said disk cartridge comprising:

a) a flat rectangular main body having broad top and bottom walls connected by shorter walls around part of its periphery to form a three-walled enclosure with one open side into which said recording medium may be received, said main body further having a semicircular wall within the enclosure to position said recording medium; and b) a closure member adapted to swing from an open position, in which said recording medium may be introduced into the main body enclosure through said one open side, to a closed position whereby said closure member closes off said one open side of said main body to lockably secure said recording medium within the enclosure, said closure member being pivotable between open and closed positions by a hinge connecting the closure member to the open body, wherein said closure member pivots about an axis at one side of said one open side, in a plane parallel to the broad top and bottom walls, wherein said disc cartridge further comprises means for unlocking said closure member when in said closed position to thereby allow said closure member to be pivoted to said open position.

2. A disk cartridge adapted to releasably receive therein a disk-shaped recording medium for engagement by a recording reproducing means within the cartridge, said disk cartridge comprising:

- a main body of the cartridge for rotatably housing therein a disk-shaped recording medium, said main body of the cartridge having a major surface for extending over said recording medium and an opening on the major surface thereof for exposing the signal recording surface of the disk-shaped recording medium accommodated therein to the outside and an insertion/detachment aperture for the disk-shaped recording medium on a lateral side thereof normal to said major surface, and
- an opening/closing member having a pivot section on a first side thereof fulcrumed at one end of said aperture of said main body of the cartridge for opening or closing said aperture, said opening/closing member having a resilient arm on a second side thereof, said resilient arm having a retaining end pawl engaging in a mating retaining section provided on the other lateral side of said main body of the cartridge for lockably securing said disk-shaped recording medium within said disk cartridge.

* * * * *